United States Patent [19]

Mehl et al.

[11] Patent Number: 4,664,670

[45] Date of Patent: May 12, 1987

[54] TRANSFER PRINTING SHEET CARRYING IMPREGNANT AND TRANSFER PRINTING OF CELLULOSE, WOOL, SILK OR POLYAMIDE TEXTILE MATERIALS

[75] Inventors: Wolfgang Mehl, Geneva; Albert Amon, Lausanne, both of Switzerland

[73] Assignee: Sicpa Holding SA, Switzerland

[21] Appl. No.: 681,832

[22] Filed: Dec. 14, 1984

[30] Foreign Application Priority Data

Dec. 16, 1983 [CH] Switzerland .......................... 6715/83

[51] Int. Cl.$^4$ ...................... B41M 5/02; C09D 11/02; D06P 1/44; D06P 3/82
[52] U.S. Cl. .......................................... 8/470; 8/471; 8/532; 8/568; 8/586; 8/602; 8/918; 8/675; 8/543; 428/195; 427/146; 106/20; 430/105
[58] Field of Search ...................... 8/471, 470; 428/195

[56] References Cited

U.S. PATENT DOCUMENTS 2,911,280 11/1959 Cicogna ................................. 8/470
4,167,392 9/1979 Defago ................................... 8/471

FOREIGN PATENT DOCUMENTS 160767 11/1985 European Pat. Off. .
52-66785 6/1977 Japan .
53-78386 7/1978 Japan .
2112422 7/1983 United Kingdom .

Primary Examiner—A. Lionel Clingman
Attorney, Agent, or Firm—Ostrolenk, Faber, Gerb & Soffen

[57] ABSTRACT

The transfer sheet or web is intended for the use in a heat transfer printing process of cotton, of cotton-polyester blend or of nitrogen containing textile fibers such as wool, silk or nylon.

It comprises on its surface at least one organic impregnating agent which has a melting point between 60° and 230° C. and is no polymer, at least one water insoluble, non-subliming dyestuff, and the minimum amount of a binder. The dyestuff forms a pattern or image which is heat contact printed on said textile substrate without the use of carrier vapors or vacuum. The pattern to be heat transferred may also be prepared in an electrophotographic process using a new toner comprising particles of impregnating agent, binder and dyestuff.

The pattern on the transfer support is transferred at a temperature between 160° and 230° C. during 30 to 60 seconds to said textile substrate. The printings obtained have very good light, rubbing and washing fastnesses; the handling is not impaired.

14 Claims, No Drawings

TRANSFER PRINTING SHEET CARRYING IMPREGNANT AND TRANSFER PRINTING OF CELLULOSE, WOOL, SILK OR POLYAMIDE TEXTILE MATERIALS

This invention belongs to the field of transfer printing, especially of textile materials, and contemplates new and useful transfer printing substrates in sheet or web form. It further contemplates a transfer printing method for the printing of designs or other distinguishable marks on cellulose containing or nitrogen containing textile fiber products, for example such as cotton, regenerated cellulose (Rayon) and fiber blends or blended fabrics of these cellulosic materials with other natural or synthetic fibers, particularly polyester, and of wool, silk and polyamides.

The transfer printing, sometimes also called dry thermal printing or gas phase printing, is a method basically known to the man skilled in the art, and the principles thereof are disclosed in, for example, French patent specifications Nos. 1,223,330 and 1,585,119 which are incorporated herein by reference. In this method, an auxiliary support, preferably a paper, namely the transfer sheet which has been printed in the desired design with one or more suitable dyestuffs, is contacted by its major surfaces with the material to be printed. At temperatures of from 160° to 220° C., the dyestuffs are transferred from the transfer sheet to the textile material since the prior art uses dyestuffs having such a high vapour pressure at the temperatures of the method that their vapour overcomes in reasonable time periods and in the necessary amounts the distance between the transfer sheet and the textile substrate.

The dyestuffs used in this known method are typically dispersion dyes having a relatively low molecular weight; these dyestuffs have however appreciable affinities only to synthetic fibers, particularly polyester and polyacrylic fibers, but not for cotton and other cellulose containing fibers as well as nitrogen containing natural and synthetic fibers such as wool or silk.

Higher molecular weight dyestuffs, which are in principle also sublimable, may be transferred by the application of negative pressure (vacuum) better than under the normal atmospheric pressure, but this possibility can normally not be used since it is too expensive, and it does not yet permit the use of important cellulose affine dyestuffs, for example reactive dyestuffs, sulfur dyestuffs, pigments like phthalocyanines, etc., namely dyestuffs which cannot be sublimed.

The use of the corresponding carbinol bases instead of the dyestuff salts, when cationic dyestuffs are concerned, does not resolve the problem to print cellulose containing textile material in the transfer method which is known to be an advantageous, technically progressive method.

It has already been tried to enhance the affinity of the cellulose for the mentioned dyestuff classes, namely those which can be transferred at higher temperatures via their vapour phase, by certain pretreatments. These pretreatment methods can be ranged in three classes:

(a) resin pretreatment;
(b) chemical modification of the fiber, and
(c) treatment of the fabrics with a solvent for dispersion dyes.

However, experiments with all these three methods have not resulted in the expected break-through of the technique since the corresponding method has too many inconveniences; examples of such inconveniences are the (uncontrollable) degradation of the touch and handling, the unsatisfactory fastnesses and the impairing of the subsequent high-grade finishing. The chemical modification of the fiber materials is non-sensical (since cellulose fibers should be maintained), very expensive and modifies also physical properties of the fiber often in undesired directions. The fastnesses of the printings are commonly unsatisfactory.

Also the method of the pre-swelling of the cotton which might be promising by itself could not be introduced due to the insufficient fastnesses of the printings, since only limited dyestuff classes can be used, as it has already been discussed.

Whereas at the gas phase transfer, the dyestuff must be transported by diffusion and sublimation over the distance between the transfer paper and the textile substrate which is a relatively slow process, there is another transfer method called solvent transfer wherein the dyestuff is transferred after its liberation from the paper by a diffusion through a solvent phase.

One of these known methods is the Fastran process, see, e.g., British Pat. No. 1,284,824 (1970) where water is used as solvent. This method is not widely used since reproducible results are very difficult to obtain when the method is carried out in a continuous manner.

Another method in this class of the solvent transfer processes is the melting transfer method, and the most important would be the "star printing" process according to U.S. Pat. No. 2,911,280 (1953). This process is still carried out on an industrial scale.

In this process, a release paper is first prepared by coating a base paper with a resin blend. The so obtained layer is covered by a second layer comprising a resin melting at about 100° C. This second resin layer is then printed with a printing ink whose binding agent will be remained solid at the transfer printing temperature. Before the transfer printing, the material to be printed is pretreated with a developing and fixing composition selected in function of the dyestuff class used on the transfer sheet. The transfer printing temperature is about 150° C., and the contact pressure in the calenders is about 10 to 15 MPa. After the transfer, the textile material must be steamed, and the resins must be washed out.

A first improvement of this process has been effected by Dai Nippon, see Netherlands Patent Publication No. 7,302,988 (1974) where a modification of the resin film leads to a reduction of the transfer temperature to about 30° C. The contact pressure, however, must remain at about 15 to 20 MPa, and the fixing and washing steps must be also maintained in this process.

A further improvement of this method is the film release process of the Fabprint Company, see, e.g., U.K. Pat. No. 1,496,891 (1975). In this method, a special release paper is printed with a printing ink which contains a binder, and this binder becomes tacky at the transfer printing temperature and effects the transfer of the dyestuff system to the textile material. The transfer printing temperature is about 60° to 150° C., typically 100° C., and the contact pressure 2.5 MPa.

After transfer, the printing design must be fixed, for example in a transfer calender at 200° C. and at a time period of 30 seconds, or by steaming, depending upon the nature of the dyestuff system.

In this method, the polymer film on the transfer sheet which effects the transfer should be broken up and remains in the form of polymer islands on the material.

All these methods have as a common feature that a necessary contact pressure, being in the range from about 2.5 to about 20 MPa, can only be achieved in textile or paper calender presses whereas the transfer calenders specially developed for the sublimation transfer printing, which can only achieve a contact pressure of 0.5 to 3 MPa, cannot or no longer be used for these processes.

Further inconveniences of these processes are the necessary of a polymer film on the transfer paper which must then, after transfer to the textile material, be washed out or remains as islands on the material, that complicated and expensive printing inks are necessary, and that the use of the offset printing method is very difficult or even completely impossible in the Fabprint process.

Therefore, there is still an urgent need for a simple and inexpensive process which allows the production of even, qualitatively high performant printing without need for a special pretreatment of the celluloses containing textile material and without the need for special machinery, according to the principle of transfer printing and permitting the use of a wide variety of dyestuffs. The transfer printing process should be maintained since it is an elegant and a clean process with a minimum of environmental charge.

It has now quite surprisingly be found that the above defined requirements can be fullfilled when, according to this invention, first a transfer sheet is prepared by coating a substrate such as paper with a certain impregnating composition as defined below. A printing pattern or design is then printed on this coating. The dyestuffs to be used will be defined later too.

Such a transfer sheet will then be used to effect a transfer printing on normal, not specially pretreated textile webs or textile articles made of cellulose containing materials such as cotton, linen, regenerated cellulose as well as their blends with synthetic fibers, especially polyester, and there are obtained even transfer printings without impairing the touch and the other outstanding properties of cellulosic fibers.

In the same manner and in obtaining the same good and surprising results as to fastnesses, especially washing, rubbing and light fastnesses, nitrogen containing textile materials such as wool, synthetic polyamides and silk, may be printed by the transfer method.

Particularly brilliant, nice and deep printings with still improved properties are obtained when the textile substrate is pretreated with a fiber swelling agent which is preferably a dyestuff solvent. However, such a swelling pretreatment is not compulsory for the success of the invention.

Before defining the impregnating composition and the dyestuffs to be used, the following should be noted. Without imparting any limitations to this invention, it is supposed that the dyestuffs are really transferred from the transfer sheet to the textile material, but that the transfer would not be made via the gas or vapour phase but via another phase since dyestuffs are transferred which do substantially not sublimate neither under normal atmospheric pressure nor in vacuo.

Nevertheless, the process of the invention may also be carried out with subliming dyestuffs.

We suppose that the impregnating composition or agent seems to be, on one hand, a vehicle or carrier for the dyestuffs, and, on the other hand, a swelling agent for the fibers and, at the same time, perhaps also a fixing agent for the dyestuffs when they have been transferred to the textile material, on or within the fibers. This has a particular importance in this invention.

The impregnating agent must have the following properties or must fit in with the following requirements:

1. It is a substance which must have a melting point and which is solid at normal room temperatures, i.e. up to 25° C., preferable up to 35° C. The melting point should be in the range of from 60° to 230° C., preferably between about 80° and 200° C.;

2. It should be substantially colorless and neither have a bad smell nor be toxic as a solid, a liquid (melt, solution) or a gas;

3. It should not attack the fibers and damage them, at least not permanently, and should be capable to be eliminated in a simple way from the printed textile material without any change of the properties of the printed pattern;

4. It should be a solvent for the dyestuffs under the conditions of the transfer printing but should not present any interaction whatsoever like dissolution, with the dyestuffs at temperatures up to about 60° C., i.e! below its melting point; the later property is important during the manufacture of the transfer sheet. It should also not be a film forming polymer;

5. It should not attack the dyestuffs and should not be attacked by them;

6. It should contain at least one nitrogen atom in its molecule.

These requirements are met, especially by organic compounds having at least one nitrogen atom in their molecule, for example amides, substituted and unsubstituted ureas and thioureas, saturated or unsaturated heterocyclic compounds having from about 5 to about 8 ring atoms and containing in their ring at least one nitrogen atom, a sulfur atom, an oxygen atom, or one of the groups NH, CO, CH= or $CH_2$, and being optionally substituted by one or more radicals selected from the group formed by alkyl groups having from 1 to 8 carbon atoms, hydroxyl groups, amino groups, hydroxyalkyl groups having from 1 to 3 carbon atoms, phenyl groups, cyclohexyl radicals, benzyl radicals and halogen atoms.

Such compounds and others have also been described not as transfer aids or impregnating agents, but as pretreatment agents in the French Patent Specification No. 2,296,537. In this patent, the man skilled in the art will find a series of individual compounds from which may be selected one or more compounds which he can use as impregnating agents. It is once more to be noted that these pretreatment agents have never been proposed or suggested as impregnating agents. It has further been surprising for this invention that the mentioned pretreatment agents which bring about, in a known manner, an affinity of polyamide for dispersion dyestuffs, can also be used for other, substantially not subliming dyestuffs and, on the other hand, during transfer on cellulose containing textile substrates. In addition thereto, the impregnating substances need not be present in the textile material but are transferred during the method of this invention. In particular, the following compounds can be used as impregnating agents or as decisive components of the impregnating composition:

Urea and its derivatives such as ethylene urea and propylene urea; caprolactam, imidazol, 2-methylimidazol, N-methylpyrrolidone, N-hydroxy-succinimide, 5,5-dimethyl-hydantoin, nicotinic amide, isonicotinic amide, glyoxal monourein, biuret and compounds which contain at least one of the following moieties: acyl amido, monoalkylamido, dialkylamido, amino, sulfonamido, monoalkyl sulfonamido, dialkyl sulfonamido, and acylamino. One or more of the cited compounds can be used together in the impregnating composition.

It is particularly surprising that it is possible to use substances as impregnating agents such as dimethylol urea, dimethylol dihydroxyethylene urea, and dimethylol ethylene urea which may be condensed during or after transfer and will give a permanent finished textile material. In this process variant, the material is preferably pretreated with one of the curing catalysts know to the man skilled in the art, e.g. a metal salt, and with other finishing agents such as touch improving agents or hydrophobing agents, and the heat transfer is effected at about 180° C. and at a contact time of about 3 minutes. This process variant allows a simultaneous transfer printing and crease-proof finishing.

The impregnating agent or, respectively, the compounds which are contained in the impregnating composition may be applied as such onto the web or the transfer sheet to be prepared. This transfer sheet is generally the already known transfer paper. For coating this paper, the respective compounds may be applied from the melting state, which is however less preferred, or in solution or suspension which may further contain a film forming binder. On selecting such a binder, it is important to find compositions which provide even in small percentage amounts in the coating composition, e.g. from about 5 to 30% by weight of the solids content, a satisfactorily adhering layer; it is believed that higher binder concentration would impair the effect of the impregnating agent. For the rest, the performing and achievement of such a coating is known to the man skilled in the art.

It has been found that satisfactory transfer printings are obtained when the thickness of the film formed by the impregnating composition on the transfer substrate will be from about 3 to about 30 μm. Best results are typically obtained with thicknesses of about 15 μm.

The application of the impregnating agent or the impregnating composition further containing the film forming binder and optionally still other products, on the whole surface may be made by any application method known per se. The gravure printing is for example appropriate. However, still other techniques may be used such as roller coating, doctor blade coating, spraying, etc.

The solvent or the dispersion agent being used when applying the impregnating composition on the transfer support depends generally on the nature of the impregnating agent and of the binder optionally present as well as on the process of the application to the transfer support. Good results were obtained with a solvent which is a mixture of toluene, xylene and ethanol, and with a binder which is ethyl cellulose, hydroxyethyl cellulose, hydroxypropyl cellulose, cellulose acetate, cellulose acetate butyrate, cellulose acetate propionate, an acrylate or a polyvinyl acetate, or mixtures or copolymers thereof. For printing of light weight materials such as voile, or other materials for which the touch is particularly sensitive, it may be useful to use a binder for the impregnating agent which is a water soluble polymer like hydroxypropyl cellulose, certain polyacrylic salts or polyvinyl acetates which, after transfer, may be removed from the textile material together with the impregnating agent by a simple rinsing step, preferably with cold water.

The impregnating agent used in most cases together with the indicated systems is preferably epsilon caprolactam, nicotinic amide, propylene urea, ethylene urea, glyoxal urein, 5,5-dimethylhydantoin, urea, or another amide, which may also be existent in cyclic form.

Base papers coated with these compositions in the indicated thicknesses are then printed, after drying if necessary, with a color design or pattern in a known printing process such as offset, gravure, flexo or screen printing etc.

Quite surprisingly, the dyestuffs to be used are not the so called transfer dyestuffs since they are substantially not sublimable to the extent necessary in this technique, even in vacuo.

The dyestuffs which will be used in this invention are selected from those which
  (a) do not substantially sublimate under the conditions of the sublimation transfer printing,
  (b) are not or only sparingly water soluble, at least in the neutral region, and
  (c) have thermosol properties, i.e. withstand short dry heating to a temperature in the range of from 180° to 210° C. and are capable of being fixed in textile fibers during this heat treatment.

The maximum allowable water solubility is defined as follows: The dyestuff to be selected is refluxed in 0.1 molar aqueous sodium carbonate to form a boiling saturated solution. This boiling saturated solution must not have an optical absorptivity above 30.

Such dyestuffs may belong to a great variety of dyestuff classes, namely, e.g. the dispersion dyestuffs, anthraquinone dyestuffs, phtalocyanines, reactive dyestuffs, azo, acid and sulfur dyestuffs, etc.

Examples of dyestuffs which may be used are:
  azo compounds as described in German Offenlegungsschrift No. 29 16 137, published 30.10.1980, which are free from water solubilizing substituents;
  modified copper, nickel or cobalt phtalocyanines, disclosed in German Offenlegungsschrift No. 29 09 012, published 11.9.1980; and in DE-OS No. 28 42 187, published 10.4.1980;
  azo compounds based on the coupling product of a diazo compound with a malonic ester derivative, as shown in German Offenlegungsschrift No. 27 00 223, published 6.10.1977;
  anthraquinone compounds, derived from 1,4-diamino anthraquinone, bearing a substituent in the 2-position bound via sulfur or oxygen, as disclosed in German Offenlegungsschrift No. 28 46 168, published 8.5.1980;
  and the great variety of dyestuffs belonging to several classes as described in detail in German Offenlegungsschriften Nos. 25 24 243 (B.A.S.F.), published 9.12.1976, and 18 11 796 (DuPont de Nemours), published 6.8.1978.

Until now, it has been considered as absolutely impossible to have such dyestuffs transferred from one substrate to another in transfer calenders; in the publications cited above, the transfer printing is therefore not mentioned with one sole word or described as perhaps possible.

It has been very surprising to state that brilliant printings having good light, washing and rubbing fastnesses can be provided when the transfer sheets as described above are printed on textile webs of cellulose, polyamide or mixtures of cellulose or polyamide with polyester in conventional transfer presses in the temperature range of from about 160° to 220° C. and contact intervals of from 10 to 60 seconds. This result is particularly surprising since conventional transfer sheets printed with the dyestuffs mentioned above, i.e. papers not coated with one of the cited impregnating agents, will not provide under the transfer conditions defined above, a transfer of noticeable amounts onto the fibers or the fiber blends even if these materials have been provided with a swelling agent.

As described above, the invention comprises two steps. The first step is the coating of the transfer base paper with a impregnating composition which is then, in the second step, printed with a printing pattern. However, it is also possible to get the same result by a one-step procedure. In this embodiment of the invention, the use of gravure printing which is normally used to print the color pattern, is generally no longer possible. The one-step procedure consists in combining dyestuff or dyestuffs and impregnating agent into one composition which further contains of course the other auxiliary agents such as film forming binder, solvent, viscosity controlling agents, etc. This combined composition is then printed as a design on the basic transfer sheet. In this case, the basic transfer sheet is generally first provided with a release coating which guarantees a high transfer ratio of the dyestuffs. Such a release coating may consist of a polymer, e.g. a silicone resin. A particularly good transfer is achieved when the release coating comprises a coating of about 2 to 5 microns of one of the impregnating agents discussed above.

Since the amounts of the combined composition to be applied to unit surface of the transfer sheet compared with the amounts which can be printed in gravure printing, other printing processes might be selected, in particular screen printing.

The invention further contemplates a printing ink, especially screen printing ink, for its use in printing of the basic transfer sheet as described above. This printing ink of the invention contains one or more impregnating agents as described above in a solvent, one or more dyestuffs, and one or more binders to fix the components of the ink one the transfer sheet.

This printing ink which makes possible the one-step preparation of the transfer sheet, provides a technologically simple process and in addition the advantage that only such portions of the transfer sheet are coated with impregnating agent where there is also a dyestuff, and this technique is of course material saving.

The binder which should be a film forming one, may be selected from those used for the two-step process. It is intended that the binder is during transfer printing not or only in a small extent transferred to the textile material, and that any transferred binder would not form a film on the textile material. The following measures which go into this direction may be applied individually or in combination:

use of small amounts of binder which are just sufficient, i.e. from 5 to 25, preferable from 5 to 10% by weight, based on the total solids content of the printing ink;

choice of binders which form films as "soft" as possible;

addition of substances which lower the cohesion of the film at normal temperatures (organosilicon compounds, fatty acid derivatives) or which become effective at higher temperatures (temperature sensitive organosilicon compounds; solid compounds which react in molten state to the formation of antifilming agents);

use of heat unstable binders; at the transfer temperature, there is in this case no longer any binder;

addition of compounds and/or selection of such binders which have an increased affinity to the basic transfer paper, since the binder will undergo a partition under transfer conditions between the two substrates, namely textile and basic transfer sheet, according to its respective affinities.

The choice of the two-step or the one-step process will therefore depend primarily on the already existing printing installations or their desired workload. The one-step technique has not only the advantage to save impregnating agent since only those portions of the transfer sheet are provided with impregnating agents which also contain dyestuff, but also to avoid any risk of a modification of dyestuff-free fibers by excess impregnating agent.

It has been found that the penetration of the printing pattern into the textile structure is much deeper when more impregnating agent has been coated onto the transfer paper.

This is an important advantage of the new process compared with the conventional sublimation transfer printing where the penetration can only be controlled by expensive machinery, such as vacuum calenders or gas stream machines or, in a relatively insignificant manner, by the selection of special dyestuffs.

It may happen that the amount of impregnating agent on a transfer paper is just not sufficient for a certain application purpose. It has now surprisingly be found that, in such cases, it will be sufficient to improve the penetration when an already printed tranfer paper is afterwards overcoated with additional impregnating composition containing one or more of the above mentioned impregnating agents in aqueous or organic solution or dispersion, and drying thereafter the applied coating. For this use, urea is the preferred impregnating agent.

This possibility improves the flexibility and versatility of the process of this invention, especially since the quality of this overcoating is not very important, particularly concerning adhesion and evenness. This overcoating may therefore be carried out with relatively simple devices.

The process of this invention provides, in these two embodiments, the excellent and surprising results already discussed above. The color strength of the printings may now still be improved together with the fastnesses when the textile material is pretreated before the transfer printing with an agent which improves the dyestuff pickup.

Such agents or compositions which make the fibers more receptive for the dyestuffs and which have an affinity thereto may generally be found among the substances which have already been described above as impregnating agents. Preferably, the same substance will be used as a textile material pretreating agent and as an impregnating agent for the transfer printing of this invention, e.g. epsilon-caprolactam. Small amounts of polyethylene glycols and polypropylene glycols, about 5% by weight thereof, as well as their mixed condensates have been proved particularly appropriate for the pretreatment of cellulose containing substrates; printings with higher color depth and good fastnesses and furthermore a better touch and antistatic properties are obtained. With these polyalkylene glycols, the washing of the printed substrate may be forgone, and this is a further advantage of the present invention.

The use of these agents is particularly simple when the textile material should be permanent finished before printing since these products may then be applied together with the finishing agent.

The pretreatment described above can be carried out by several methods. Preferably, a diluted solution of a polyethylene glycol in water, e.g. 5% by weight, is applied on the pad mangle. With a pickup of 100%, such a solution will provide after drying a net add-up of pretreatment agent of 5% by weight. This pretreatment can be combined in an advatageous manner with the normal washing carried out before the transfer printing. Only one drying step will be sufficient as before, if one proceeds in the following way: the textile material is washed and rinsed as before and then squeezed to 50% squeeze effect. Then it is pad mangled with a 10% aqueous solution of the pretreating agent, again squeezed to 50% and finally dried. This textile material will contain about 5% by weight of the said agent.

The pretreatment of the textile material to be printed with agents which make the fibers receptive for the dyestuffs, can be used when, by any reason whatsoever, the amount of impregnating agent on the transfer paper will not be sufficient, e.g. should a particularly deep penetration be achieved.

It may be in some cases interesting to apply dry impregnating compositions on a material to be printed. To obtain this, a base paper which is only coated with impregnating agent but not printed, is transfer printed on the textile material. For these applications, very short transfer times are sufficient, typically 10 to 30 seconds at 170° to 200° C., preferably 20 seconds at 190° C. This method is particularly interesting when local patterns should be printed on already made garments, and the transfer paper does not contain sufficient amounts of impregnating agent.

As a basic paper which is transformed in two steps or in one step as described above, to give a transfer sheet ready for use, normal paper can be used which is fitted for transfer printing and which has a basic weight of from about 30 to 100 g/m², typically 40 or 60 g/m². These conditions are known to the man skilled in the art.

The transfer printing may be realized on the conventional calenders or presses designed for the sublimation transfer without use of vacuum or carrier gas. These methods are also known to the man skilled in the art and need not be described here. An important advantage of this invention is the fact that already existent and expensive transfer calenders may be used without transformation.

The textile materials transfer printed by the process of this invention and also the transfer sheets have a substantially unlimited storage time. It is however recommended to confer the normal high finishing resin treatment before or after transfer printing or, should special reasons not recommend such a finishing, to rinse the textile material with water and to dry it.

Furthermore, it has been surprisingly found that the transfer sheets of this invention give brilliant printings on regenerated cellulose in the form of rayon, viscose and polynosic having good rubbing, washing and light fastnesses. Known processes based on the swelling of cellulosic fibers with water only result, in spite of high machine expenses and intensive pretreatment of the textile materials, in pale and faint printings with insufficient fastnesses.

The transfer sheets of this invention therefore have the further advantage compared with the prior art that more universal fiber classes can be printed. This advantage is very important in the case of fiber blends with polyester fibers since regenerated cellulose is often used for this purpose.

To print the color pattern on the transfer sheet coated with impregnating agent, several printing processes may be used. The most important are gravure, offset, flexo and screen printing. However, other printing methods can be applied.

The printing industry has looked since a long time, particularly since the development of modern photocopies, for electrostatic or magnetic gravure free printing methods for the textile industry where the orders for a specific pattern or design are often very small and therefore, the numbers of design for unity area are numerous.

A gravure free textile printing method based on the use of electrophotographic toner powder containing sublimable dyestuffs is known, for example from Swiss Patent Specification No. 619 342 (DuPont, 1977).

It is further known from U.S. Pat. Nos. 4,145,300; 4,134,676 and 4,246,331 that electrophotographic reproduction methods may be used for the rapid and gravure free preparation of transfer papers for the conventional sublimation transfer printing. For this purpose, a latent electrostatic charge image formed on a photoconductor is developped with toner powders which contain sublimable dyestuffs.

One-component magnetic toners have proven successful for this application, but two-component toners containing sublimable dyestuffs have also been described before, for example in U.K. Patent Application No. 2 095 855.

Conventional copying facilities are used for one-component as well as for two-component toners, and the optics of these facilities are adapted to produce laterally inversed images which are laterally correct after thermoprinting.

The toners containing the conventional sublimable dyestuffs can however only be used on thermoplastic articles and not on cellulose fibers such as cotton.

PCT Patent Application No. WO 83/00235 discloses a method wherein heavy, water insoluble dyestuff molecules are incorporated into one-component magnetic toners. These dyestuffs should be transferred under an subatmospheric pressure of about 100 mbar in 30 seconds at 220° to 230° C. from the transfer paper to cellulosic fibers which are swollen with water and whose swelling state is maintained after dehydrating by about 10% of polyglycol having a molecular weight of about 400.

This suggestion has several serious drawbacks; one of them is the fact that a relatively strong vacuum is to be used, and sealing problems will arise. This makes the method very expensive. The polyglycol remaining in the textile material after transfer printing is another drawback.

Therefore, there is still an urgent need for an electrophotographical printing method for cellulose fibers.

The present invention, slightly modified to adapt to electrophotography, is now capable of filling in this gap. It provides the use of a two-component toner. Such toner contains a blend of fine toner particles carrying a dyestuff, with relatively coarse carrier particles. In developing stations using two-component toners, the carrier transports the toner particles over the latent charge image provided on a photoconductor such as selenium. The toner particles charge themselves electrostatically by the contact with the carrier particles and deposit on the charged portions of the photoconductor whereas the carrier particles fall down into the developer station and are there recombined with other toner particles. From time to time fresh toner particles must be filled into the developer station. In the often used magnet brush developer zones, a carrier is of ferromagnetic particles containing e.g. iron, steel, iron oxide or ferrite. It has now been found that a toner may be prepared by a combination of the above defined impregnating agents and the dyestuffs described herein, and appropriate polymers, and these toners will allow the preparation of photocopies in conventional copying facilities which can be used as transfer papers for the transfer printing of cellulose fibers and fiber blends of cellulose and synthetic fibers. No pretreatment or post-treatment of the textile material will be necessary, and conventional transfer presses and calenders may be used.

It is preferred to use toners comprising particles formed by a mixture of impregnating agent, dyestuff and binder. Preferred binders are acrylic resins having a softening point between about 60° and about 120° C. Preferred impregnating agents are urea, 5,5-dimethylhydantoin and nicotinic amide.

It is also possible to impregnate the copying paper with an impregnating agent as an overcoating so that the toner consists substantially only of dyestuff and binder. It is further possible to use a blend of toner particles only containing dyestuff and binder with such particles which consist only of impregnating agent and binder.

The dyestuff concentration normally amounts to from about 2 to about 30% of the weight of the toner, and the concentration of the impregnating agent will be up to 90% of the toner weight. The toner particles may contain still further substances such as softening agents, waxes, dispersing agents, flowing agents, etc.

Should the toner contain the impregnating agent, the base transfer paper may be a conventional copying paper. Better transfer yields are achieved when the paper is first coated with a release layer, e.g. of a silicone resin, or a layer of an impregnating agent having a thickness of at least 3 microns. Should the toner be free of impregnating agent, the base paper must first be coated with a layer of the impregnating agent having a thickness of about 15 microns.

The toner is fixed on the paper by mechanical pressure or by heat, or by a combination of pressure and heat. The transfer sheet of this invention may be prepared by still other methods. Such methods are the rapid printing in automatic date processing, such as impact printers with color ribbons or non-impact devices, particular ink jet methods.

Ink ribbons which will give printings to be used in this invention, may be prepared from coating compositions wherein dyestuffs are formulated on appropriate mixing devices, such as the three-roller mill, together with a mixture of mineral oil and non-drying animal or vegetable oils, and the homogeneous mixture thus obtained is used to impregnate the ink ribbon.

Ink jet processes or other jet methods use ultrafine dispersions of the active materials in water or, alternatively, solutions in organic solvents.

Finally, the dyestuffs may be applied with felt-tip markers on the base paper, especially for correction purposes. These felt markers are impregnated preferably with appropriate inks having colophane resins as binders, which are dissolved in alcohol and then mixed with a solution of the dyestuffs of the invention in toluene.

The dyestuffs to be used in this invention have further been selected by simple experiments wherein transfer supports coated with impregnating agent and then printed with the dyestuff to be selected, have been contacted with cotton samples during 30 seconds at 210° C. whereupon the printing results where evaluated. It has then be found that the penetration of the fabric by the dyestuff increases with increasing amounts of impregnating agent on the transfer paper and further depends on the nature of this impregnating agent. Of course, the amount of impregnating agent is limited by economic considerations; a substantially complete transfer of a dyestuff will be achieved with the amounts mentioned above, corresponding to an upper limit of 25 to 30 g of impregnating agent per $m^2$ of transfer paper. The following commercially available dyestuffs have been found to be well suited:

Yellow dyestuffs

C.I. Disperse Yellow 213
C.I. Disperse Yellow 136
C.I. Disperse Yellow 181

Red dyestuffs

C.I. Disperse Red 220
C.I. Disperse Red 271
C.I. Disperse Red 346
Dyestuff from example 1 of DE-OS No. 28 46 168

Blue dyestuffs

C.I. Reactive Blue 6
C.I. Disperse Blue 192
C.I. Disperse Blue 238
C.I. Disperse Blue 327
C.I. Disperse Blue 328
Copper phtalocyanine dyestuff of example 1 of DE-OS No. 28 42 187, as well as the dyestuffs C.I. Disperse Orange 125, C.I. Disperse Green 7, C.I. Disperse Violet 64, C.I. Disperse Violet 89 and C.I. Disperse Brown 21.

Secondary colors can be obtained in the normal way by the use of two or more of the above listed dyestuffs.

This invention is now further illustrated by the following examples which are given for illustrating purposes only and should by no means limit the present invention.

In these following examples, all parts are by weight if not otherwise indicated.

EXAMPLE 1

In a ball mill, 20 parts of powdered epsiloncaprolactam are ground together with 10 parts of a low molecular weight ethylcellulose and 40 parts of toluene, 20 parts of xylene and 10 parts of ethanol. After a short time, a mass having a viscosity of about 100 mPa.s is obtained.

This mass is then applied by means of a roller blade on a base paper for normal transfer printing having a basic weight of 60 g/$m^2$, and the composition is dried. After drying, the thickness of the applied coating is 15 μm.

A printing ink is prepared by milling up 10 parts of the dyestuff C.I. Disperse Red 346 in a ball mill together with a solution of 10 parts of ethylcellulose N-7 in 80 parts of industrial ethanol. The milling is continued until the average particle size is 1.5 μm and no particles are greater than 4 μm. In this state, the mass has a viscosity of about 39 mPa.s.

This ink is then applied on a conventional gravure printing machine on the coated surface of the transfer paper pretreated as before, a design is formed, and the paper is then dried. In a conventional transfer printing calender, the coated and printed transfer paper is printed at 200° C. during 30 seconds on a cotton gabardine having a basic weight of 180 g/m² which has beforehand been bleached and mercerised as usual.

A brilliant red printing having really good rubbing, washing and light fastnesses is obtained which shows, compared with conventional transfer printing on polyester, a particularly deep penetration into the fabric. The properties of the fabric were the same after the transfer printing.

EXAMPLE 2

The transfer printing paper prepared by the method of the example 1 is printed in a conventional transfer printing calender at 190° C. and a contact time of 40 seconds on a fabric of polyamide-6.6. A brilliant red printing having outstanding washing fastnesses and good light and rubbing fastnesses is obtained.

EXAMPLE 3

The transfer printing paper obtained according to the method of example 1 is printed in a conventional transfer printing calender on lustrous, bleached viscose satin having a basic weight of 95 g/m². A brilliant red print with very good rubbing, wash and light fastnesses is obtained.

EXAMPLE 4

A basic paper coated according to the method in the first part of example 1 is then printed with a gravure ink containing 8% by weight of the dyestuff C.I. Solvent Blue 36. This transfer printing paper is printed in a conventional transfer calender during 30 seconds at 180° C. on a silk crepe which has been degummed and bleached beforehand. A brilliant blue printing having excellent penetration into the fabric is obtained.

EXAMPLE 5

First, a offset varnish is prepared on a three-roller mill by mixing and milling 42 parts of lacquer linseed oil, 20 parts of mineral oil and 28 parts of a phenolic resin sold under the trade name of "Abertol KP 330" (Hoechst AG).

Then, an offset ink is prepared on a three-roller mill from 28 parts of the dyestuff C.I. Disperse Blue 327, 85 parts of the varnish as prepared above, 5 parts of "Aerosil R-972" (fumed silica of Degussa AG) and 2 parts of a cobalt siccative.

The basic transfer paper coated according to example 1 is then printed on an offset printing press with a design of the offset ink prepared as above.

After drying, the paper is contacted during 30 seconds at 200° C. on a conventional transfer printing press with a tricot of 50% cotton and 50% polyester. A brilliant blue printing having good rubbing, washing and light fastnesses is obtained.

EXAMPLE 6

An offset printing ink capable of curing under ultraviolet light is prepared on a three-roller mill from 50 parts of epoxydiacrylate resin (AKZO N.V.) and 20 parts of trimethylolpropane triacrylate, 4 parts of polyethylene wax, 20 parts of a dyestuff C.I. Disperse Yellow 213 and 6 parts of benzyl dimethyl ketal (Irgacure 651, Ciba-Geigy) with grinding until the average particle size is inferior to 1.5 μm and no particle is greater than 4 μm.

A base paper coated according to example 1 is now printed with this printing ink. The printing is then cured under three ultraviolet lamps producing on the sheets a light power of 80 W.cm.

The sheets are produced with a speed of 6000 sheets per hour. They are printed at 210° C. during 40 seconds in a conventional transfer printing press on a cotton tricot. Brilliant yellow printings having excellent light, rubbing and washing fastnesses are obtained.

EXAMPLE 7

An impregnating agent is formulated into a coating mass in the following manner: on a three-roller mill, 50 parts of epoxydiacrylate resin (AKZO N.V.), 20 parts of trimethylolpropane triacrylate, 4 parts of polyethylene wax, 6 parts of benzyl dimethyl ketal, and 80 parts of nicotinic amide are ground until the average particle size is less than 5 μm and no particle is greater than 10 μm.

A base paper having a weight of 60 g/m² is coated with this composition; after curing in the device described in example 6, the thickness of the coating is about 20 μm.

The printing inks prepared according to example 6 are now printed on these papers, and the coating and printing is cured again. The transfer papers are then printed on a tricot of 65% of polyester and 35% of cotton at 210° C. during 40 seconds in a conventional transfer printing press. Brilliant yellow printings having good rubbing, washing and light fastnesses are obtained.

EXAMPLE 8

Screen Printing Ink

A screen printing ink is made on a three-roller mill by grinding of 60 parts of white spirit, 20 parts of epsilon caprolactam, 15 parts of ethyl hydroxyethyl cellulose and 5 parts of the dyestuff C.I. Disperse Blue 329. This ink is used to print on a conventional flat screen printing machine a base paper for thermo printing. The paper is transfer printed in a currently used transfer printing press on a cotton fabric at 220° C. during 40 seconds. A turquoise blue printing having very good rubbing, washing and light fastnesses is obtained.

EXAMPLE 9

Pretreated Cotton

A cotton fabric is padded with a 5% by weight aqueous solution of epsilon-caprolactam until a pick-up of 100% and then dried on the tenter frame.

A coating composition is made according to example 1, and a current transfer printing base paper is coated with such amounts of impregnating ink composition to obtain after drying a dry layer of 10 μm thick dry layer.

A printing ink is made by grinding in a ball mill 10 parts of the dyestuff C.I. Disperse Red 346 together with a solution of 10 parts of ethyl cellulose N-7 in 80 parts of industrial ethanol. The grinding is continued until the average particle size is 1.5 μm and no particle is greater than 4 μm. In this state, the viscosity in the composition is measured to be about 39 mPa.s.

A pattern is printed with this ink in a conventional gravure printing machine on the coated surface of the transfer paper as prepared above, and the paper is then dried. The coated and printed transfer paper is printed in a conventional transfer printing calender at 210° C. during 40 seconds on a cotton gabardine having a basic weight of 180 g/m² which has been bleached and mercerized before as usual. A brilliant red printing having good rubbing, washing and light fastnesses is obtained and which shows compared with the conventional transfer printing of a polyester, a particularly deep penetration into the fabric. Large surface patterns show a particular "quiet" printing image. The properties of the fabric were not changed after the transfer printing.

When the same transfer paper having only a 10 μm thick layer of impregnating agent is printed on the same textile material which has not been pretreated, only a weak, disturbed printing having many faults and being without any commercial value is obtained.

Instead of the impregnating agent epsiloncaprolactam used in the foregoing examples, good results are also obtained with other impregnating agents such as propylene urea, ethylene urea, nicotinic amide, isonicotinic amide, glyoxal monourein, 5,5-dimethylhydantoin and urea.

The amount of impregnating agent applied to the fabric may be comprised between 5 and 10% by weight of the dry fabric.

EXAMPLE 10

A base paper having a basic weight of 40 g/m² was coated with a composition consisting of 9 parts of nicotinic amide and 1 part of a polyacrylate, sold under the trade name "Paraloid B-72" by Rohm & Haas, Philadelphia Pa. U.S.A. The coating was made in such a manner that the final coating weight was 10 g/m². This paper was then printed on the coating by gravure printing with a multicolor design containing, as printing dyestuffs, C.I. Disperse Red 346, C.I. Disperse Yellow, and C.I. Disperse Blue 329.

The design was then heat transferred at 210° C. and during 30 seconds on cotton cretonne having a basic weight of about 210 g/m². The transferred image was unsatisfactory as being unsteady, uneven and faulty.

However, a uniform, brilliant and well penetrated image was obtained when the transfer paper which had been printed as described above, was overcoated, before transfer, with a composition comprising 9 parts of urea and 1 part of acrylate ester in amounts of achieving a basic weight of 10 g/m² of urea.

EXAMPLE 11

A cellulosic woven fabric having a basic weight of 200 g/m² was padded on the pad mangle with an aqueous bath containing 40 g/l of a fluorocarbon resin, sold under the trade name "Persistol O" (B.A.S.F., Federal Germany) and 2 g/l of ammonium chloride. The liquor take-up was 80%. The fabric was dried 1 minute at 120° C.

The thus pretreated textile material was now thermoprinted using a transfer paper consisting of a base paper coated with 20 g/m² of 9 parts of dimethylol urea and 1 part of acrylic ester, forming an impregnation coating, whereupon a printing design was present having been made using a printing ink based upon the dyestuff C.I. Disperse Blue 328.

The heat transfer has been made during 3 minutes at 160° C.

A uniform, marine blue printing image was achieved on the material distinguishing by a bulky, elastic touch and best oil and water repellence.

EXAMPLE 12

Toner Preparation

For the preparation of a toner, N-butylmethacrylate was melted, and in 9 parts of this melt, 1 part the dyestuff C.I. Disperse Blue 329 was dispersed. After cooling and solidifying, the solid mass was coarsely broken up in hammer mill and then finally ground in a air jet mill. From the so obtained powder, particles having a size of from about 5 to about 20 μm were seeved out using an air classifying device, and this particles served as toner particles.

4 parts of the toner powder were mixed with 96 parts of powdered iron (Höganäs W 40.37). In this manner, a toner mixture was obtained having a specific charge of 15 μC/g.

A selenium photoconductor was charged by corona discharge with positive electrostatic charges and then partially discharged by light through the image of an original. The latent electrostatic image was developed by means of a magnet brush containing the above toner mixture, and a blue copy was obtained. This image was transferred electrostatically on a paper coated beforehand with 20 g/m² of a composition made from 9 parts of urea and 1 part of an acrylic ester of the type "Paraloid B-72" (Rohm & Haas, Philadelphia, Pa., U.S.A.), and fixed by pressure.

The image support was contacted during 30 seconds at 200° C. with a cotton tricot. A brilliant, blue-green printing having excellent washing, light and rubbing fastnesses was obtained.

EXAMPLE 13

In 8 parts of molten nicotinic amide, 1 part of the acrylic ester "Paraloid B-72" (Rohm & Haas, Philadelphia, Pa., U.S.A.) and 1 part of the dyestuff C.I. Disperse Red 346 were dispersed. The melt was cooled and solidified, and the solid mass was coarsely comminuted in a hammer mill and then finally ground in a air jet mill. Particles having a diameter from about 5 to about 20μ were seeved out in an air jet classifyer and these particles were used as a toner. 3 parts of this toner powder were blended with 97 parts of an iron powder (Höganäs ACC 100-29) having a particle size distribution between 20 and 200μ. In this way, a two-component toner having a specific charge of 19 μC/g was obtained.

A selenium photoconductor was positively charged by corona discharge and then partially discharged by light coming from an original image.

The latent electrostatic charging image was now developed using a magnet brush containing a toner blend, and a brilliant red image was obtained.

This image was now transferred electrostatically on a release paper being obtained by coating a basic paper with a silicone resin. The image was fixed on this paper by heat.

This image support was now brought into contact at 190° C. and during 20 seconds with a fabric consisting of an intimate blend of 50% polyester fibers and 50% cotton fibers. A brilliant red printing having very good washing, light and rubbing fastnesses is obtained.

The preceding examples show very clearly surprising and outstanding advantages of this invention. It is clear that the practical realization of the invention in the context of the claimed matter may be varied or modified according to the knowledge of the man skilled in the art without departing from the scope of this invention. Such modifications and improvements are comprised by the protection conferred by this invention.

We claim:

1. Transfer printing support in sheet or web form for the thermoprinting of hydroxyl group or nitrogen containing textile fiber materials, characterized by the fact that it comprises, as a coating on a flat substrate:

at least one impregnating agent which is a non-toxic organic substance containing at least one nitrogen atom in its molecule, which is solid up to 60° C. and has a melting temperature in the range of from 60° to 230° C., which is liquid up to at least 230° C. and substantially colourless, and which is not a film-forming polymer;

at least one dyestuff in the form of a pattern to be transferred; and a binder, said dyestuff being selected from dyestuffs which are not substantially water soluble at least at neutral pH, which do not, visably ublimate under the conditions of sublimation transfer printing, and which are capable of thermosoling, said dyestuff and impregnating agent being selected such that the impregnating agent has solven properties for the dyestuff in its liquid state but not in its solid state. wherein the impregnating agent is selected from the group consisting of epsilon-caprolactam, nicotinic amide, isonicotinic amide, propylene urea, ethylene urea, glyoxal monurein, urea, 5,5-dimethyl hydantoin, imidaxol, 2-methyl imidazol, N-methyl pyrrolidone, N-hydroxy succinimide, biuret, dimethylol urea, dimethylol hydroxyethylene urea, dimethylol ethylene urea, and mixtures thereof.

2. Transfer printing support according to claim 1, wherein the support carries a first layer containing said binder and said impregnating agent but no dyestuff, and that this first layer supports said dyestuffs in the printing pattern to be transferred.

3. Transfer printing support according to claim 2, wherein said printing pattern to be transferred is further overcoated with a cover coating formed of at least one of said impregnating agents and a binder.

4. Transfer printing support according to claim 3, wherein said cover coating contains urea or nicotinic amide or 5,5-dimethyl hydantoin as an impregnating agent.

5. Transfer printing support according to claim 1, wherein said impregnating agent, said at least one dyestuff and said binder are present in mixture in a printing pattern.

6. Transfer printing support according to any claim 1, wherein said binder is a film forming polymer material selected from substances which not visibly hinder the dyestuff from being heat transferred to said textile fiber material and which themselves are not heat transferred in such an amount to form a film on said textile fiber material.

7. Transfer printing support according to claim 6, wherein the binder is selected from ethyl cellulose, cellulose, acetate, cellulose acetate propionate, cellulose acetate butyrate, hydroxyethyl cellulose, hydroxypropyl cellulose, acrylic acid esters, polyvinyl acetates, and mixtures and copolymers thereof.

8. A transfer printing process for printing a cellulose or nitrogen containing textile substrate by means of a transfer printing support as defined in claim 1, characterized by the fact that said textile substrate is surface contacted with said transfer printing support and the composite so formed is heated during 10 to 60 seconds to a temperature in the range of from 160° to 230° C.

9. The process of claim 8 wherein said textile substrate is a cotton fabric.

10. The process of claim 8 wherein said textile substrate is a cotton-polyester blend fabric.

11. The process of claim 8 wherein said textile substrate is a cotton fabric pretreated with an impregnating agent as defined in claim 1 in an amount of 0.5 to 10% by weight of the dry fabric.

12. The process of claim 8 wherein said transfer printing support contains a water soluble polymer as a binder, and the textile material is rinsed after said transfer printing step with water to remove any water soluble polymer binder which might have been transferred thereto during said transfer step.

13. The process of claim 11 wherein said impregnating agent for pretreatment is applied to said textile material by a heat transfer step wherein a transfer support is used comprising a surface layer of said impregnating agent, and said transfer to the textile material to be pretreated is effected during a time period of 10 to 30 seconds.

14. Transfer printing support according to claim 1, wherein said dyestuff is selected from water insoluble, not sublimable and thermosoling aminoanthraquinone, azo, modified phthalocyanine and reactive dyestuffs and their mixtures.

* * * * *